United States Patent

Van Hecke et al.

[15] 3,689,951

[45] Sept. 12, 1972

[54] FASTENER INSTALLATION SYSTEM

[72] Inventors: George J. Van Hecke, Wayne County; Robert D. Cassell, Oakland County, both of Mich.

[73] Assignee: Huck Manufacturing Company, Detroit, Mich.

[22] Filed: May 7, 1970

[21] Appl. No.: 35,393

[52] U.S. Cl..................10/155 R, 29/517, 72/391, 72/402, 81/10
[51] Int. Cl........B23p 19/08, B21d 41/04, B21j 7/16
[58] Field of Search ..10/155; 29/208, 211, 240, 517; 81/3, 10, 52.4, 52.5; 72/391, 402; 173/12

[56] References Cited

UNITED STATES PATENTS

| | | |
|---|---|---|
| 1,925,714 | 9/1933 | Crist..............................81/10 |
| 3,434,547 | 3/1969 | Mitani et al. ................173/12 |
| 3,478,564 | 11/1969 | Hurd...........................72/391 |
| 3,590,582 | 7/1971 | German et al...............173/12 |
| 3,603,132 | 9/1971 | Holmes........................72/402 |
| 3,479,714 | 11/1969 | Allsop..........................10/155 |

*Primary Examiner*—Charles W. Lanham
*Assistant Examiner*—E. M. Combs
*Attorney*—Harness, Dickey & Pierce

[57] ABSTRACT

In a two piece fastener of the type including a bolt and a nut adapted to be threaded onto the bolt and thereafter crimped to provide a desired preload a system for setting the fastener including tool means for torquing the nut onto the bolt with a preselected torque and thereafter crimping the nut to provide the desired preload and control means to sequentially control the tool.

12 Claims, 9 Drawing Figures

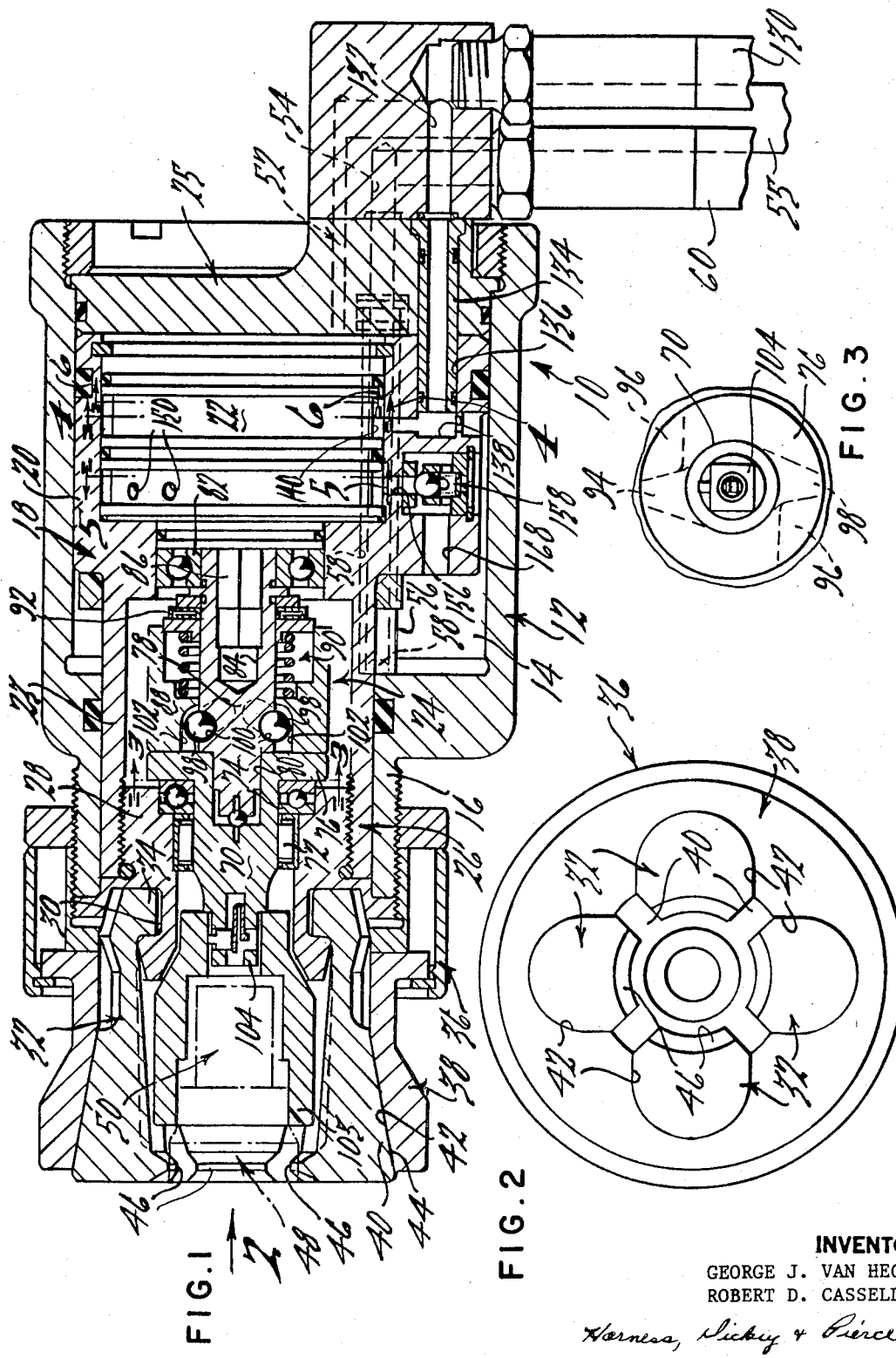

INVENTORS
GEORGE J. VAN HECKE
ROBERT D. CASSELL

ATTORNEYS

FASTENER INSTALLATION SYSTEM

SUMMARY BACKGROUND OF THE INVENTION

The present invention relates to fastener installation systems and more particularly to a system for automatically torquing and crimping a nut onto a bolt.

The system of the present invention is adapted to be used to install two piece fasteners of the type shown and described in the U.S. Pat. to J. Orloff et al., No. 3,421,563 issued Jan. 14, 1969. In that patent a unique fastener assembly is shown which provides an assembled joint having desired pre-tension or preload characteristics. With that fastener it is contemplated that the nut be torqued onto the bolt to a selected torque and that subsequently the nut is crimped to provide the desired preload. While the advantages of that fastener assembly can be realized using separate torquing and crimping tools, it is an object of the present invention to facilitate the assembly of such a fastener by providing a system utilizing a single tool which can be controlled to both torque and crimp automatically.

It is another general object of the present invention to provide a new system for installing two piece fasteners.

Other objects, features, and advantages of the present invention will become apparent from the subsequent description and the appended claims, taken in conjunction with the accompanying drawing, in which:

FIG. 1 is a longitudinal sectional view of a tool embodying features of the present invention;

FIG. 2 is a front elevational view of the tool of FIG. 1, taken in the direction of the arrow 2;

FIG. 3 is a sectional view of the tool of FIG. 1 taken generally along the line 3—3 with some parts removed in order to show generally a front elevational view of the impact wrench portion of the tool;

Figure 4:
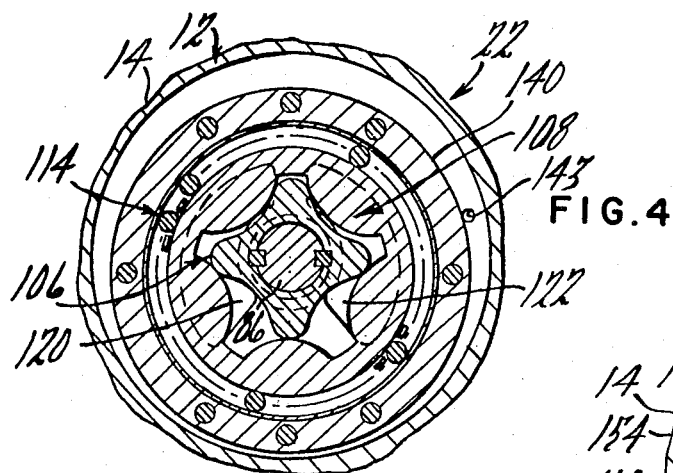
Figure 7:
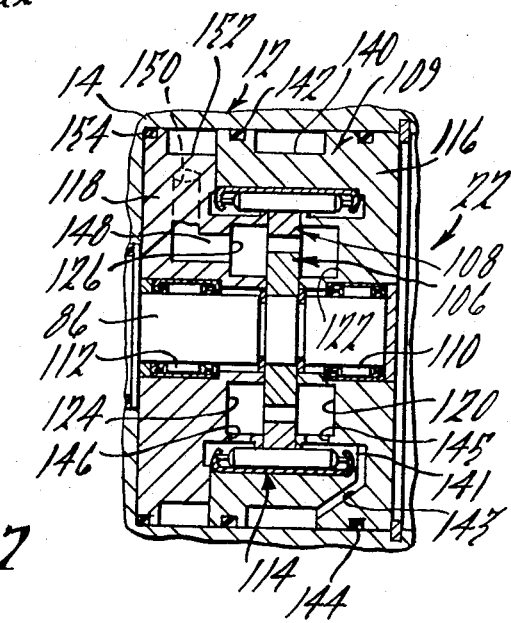
Figure 5:
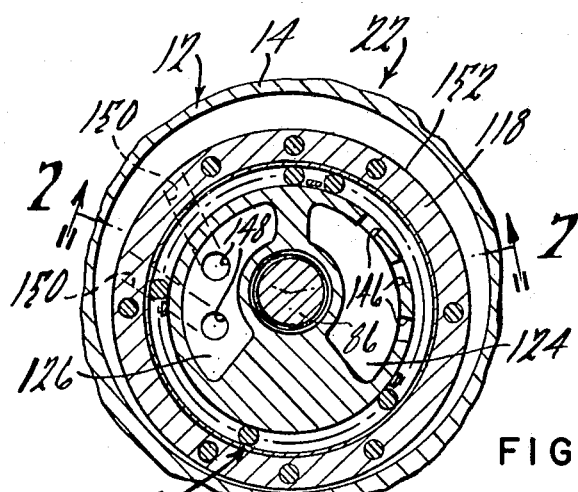
Figure 6:
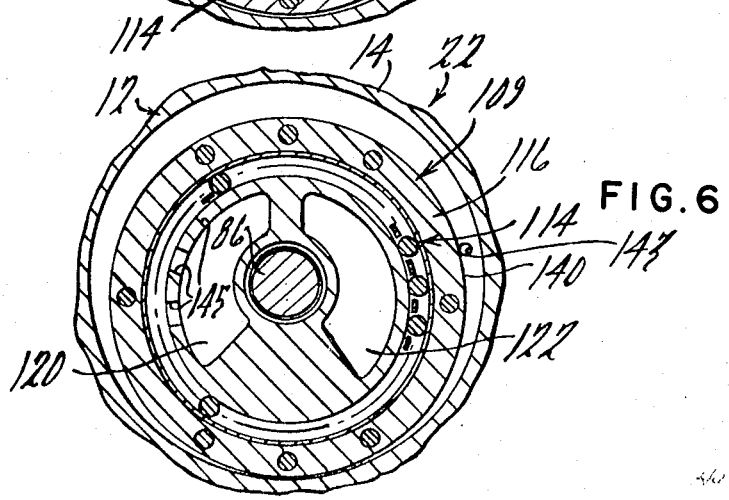

FIGS. 4, 5 and 6 are sectional view taken generally along the line 4—4, 5—5 and 6—6, respectively of FIG. 1;

FIG. 7 is a sectional view taken generally along the line 7—7 in FIG. 5; and

Figure 8:
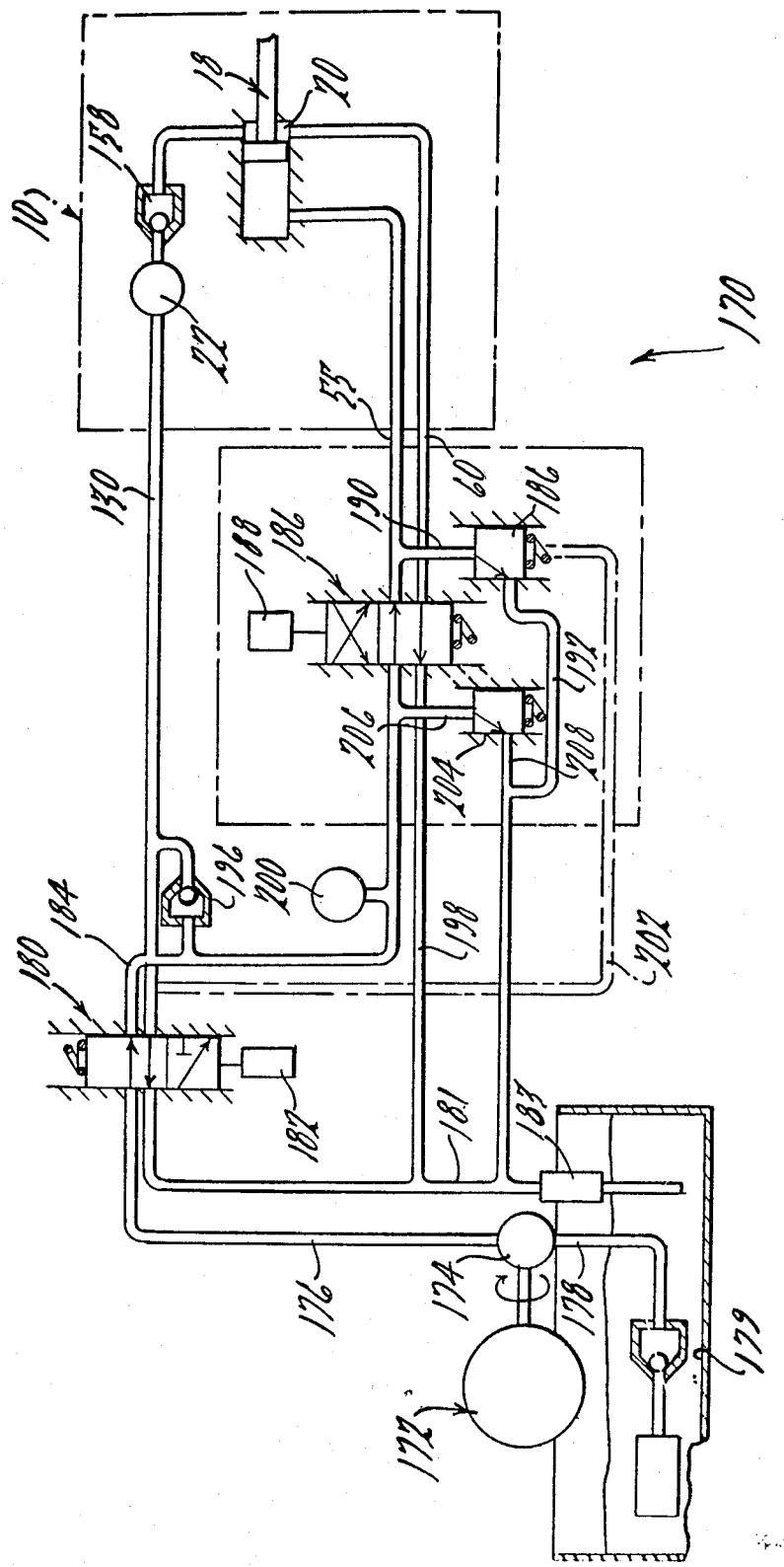
Figure 9:
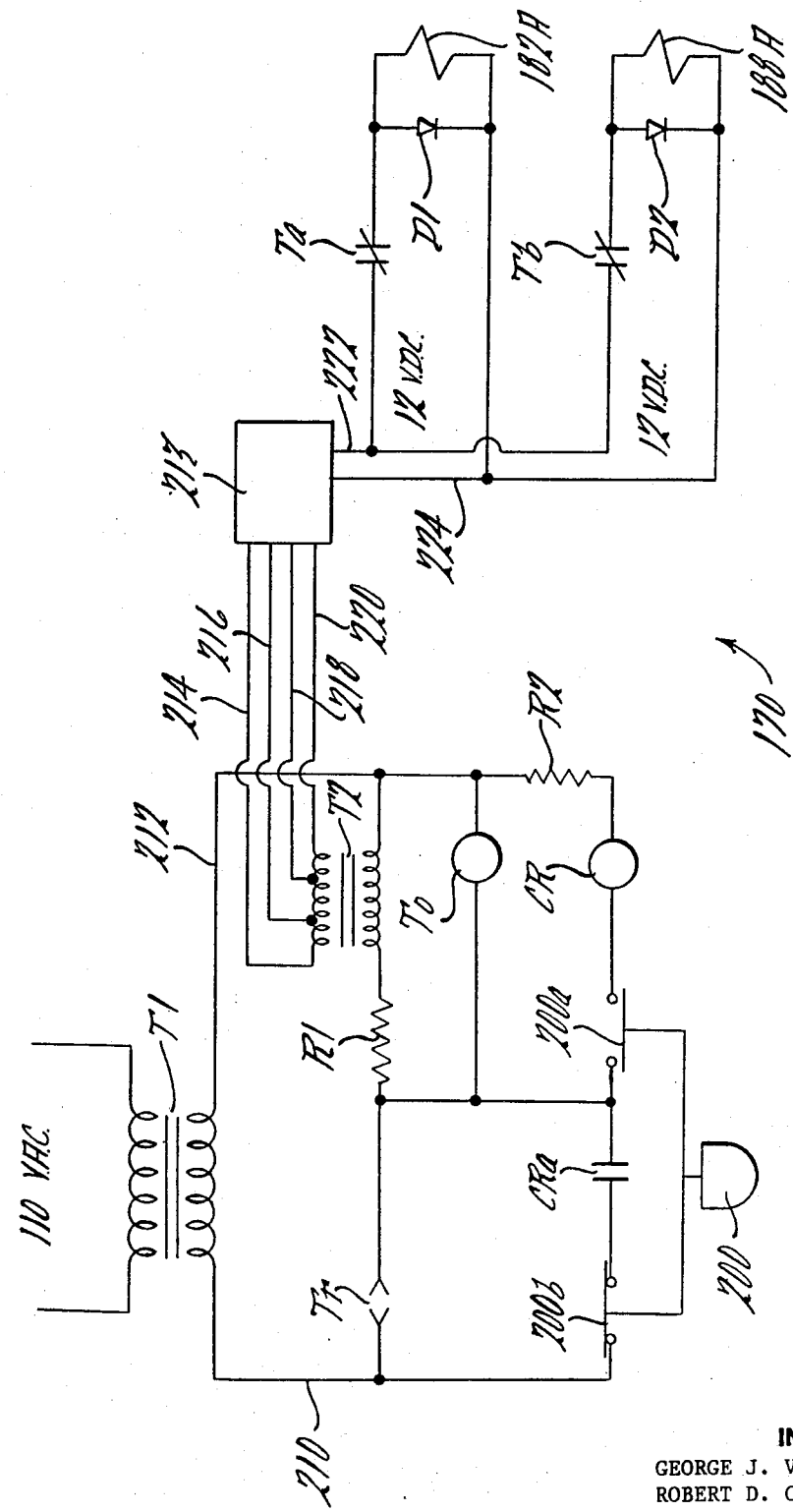

FIGS. 8 and 9 are hydraulic and electrical schematic diagrams, respectively, of a system for controlling the tool of FIGS. 1-7 for automatic operation.

Looking now to FIGS. 1– 7, a tool, embodying features of the present invention, is generally indicated by the numeral 10 and includes a crimping assembly and a torquing assembly which co-act, in a manner to be described, to provide a unitary tool which provides both torquing and crimping operations.

The tool 10 includes a hollow, tubular housing 12 which has a main housing portion 14 and an eccentric, forward portion 16. The crimping assembly includes a hollow pull piston 18 which is supported for reciprocation within the housing 12 and has a head portion 20 slidably supported in a main housing portion 14 and a rod portion 23 slidably supported in eccentric portion 16. The piston 18 is also hollow and supports a fluid motor assembly 22 and impacting assembly 24, the two of which generally define the torquing assembly (the details of which will be later described). The rearward end of the main housing portion 14 is closed by an end cap assembly 25.

The forward end 26 of the rod portion 23 of pull piston 18 is internally threaded and threadably receives an annular support collar 28. The collar 28 has an annular groove 30 at its outer end in which a plurality of jaw members 32 are pivotally supported via tabs 34. The forward portion 16 of housing 12 is externally threaded and threadably receives a jaw housing assembly 36 which terminates at its forward end in an annular jaw housing 38. The housing 38 has a central opening 40 which is scalloped or of a clover leaf shape and has individual pockets 42, each of which receives one of the jaw members 32. The jaw members 32 and pockets 42 are formed generally like a Jacobs chuck jaw assembly in that the surface of pocket 42 is generally semicircular and radially inclined and the outer surface 44 of the jaw members 32 are similarly semi-circularly contoured whereby good bearing conditions can be provided.

The forward ends of jaw members 32 normally extend outwardly beyond the forward end of the jaw housing 38 and terminate in radially inwardly extending crimping teeth portions 46. The pull piston 18 in its deactuated position is forward (opposite to that shown in FIG. 1) whereby the jaw members 32 will be at their forward most position in the jaw housing 38 and the teeth portions 46 will define the maximum opening therethrough. In this position a nut 48, which is threadably located upon a bolt 50, can be located within the opening defined by the teeth portions 46. Upon actuation of the tool 10 to move the pull piston 18 rearwardly the jaw members 32 will move relatively, inwardly into the jaw housing 38 and the co-action of the inclined surface 42 against the mating surface of the jaw members 32 will move the jaw members 32 radially inwardly until the teeth portions 46 will engage and crimp the nut 48. The nut 48 can be designed in accordance with the above noted Orloff et al patent and the teeth portions 46 shaped accordingly and arranged to crimp the nut 48 such as to provide the desired preloading of the fastened joint.

The desired reciprocation of the pull piston 18 can be accomplished by applying hydraulic, fluid pressure alternately to opposite sides of the head portion 20. To this end, the end cap assembly 25 has a fluid passage 52 which fluid communicates at one end with the head end of the main housing portion 14 and at its opposite end to a flexible fluid line or hose 55. The rod end of main housing portion 14 is communicated to one end of a fluid passage 54, through the cap assembly 25, via a hollow tube 56. The hollow tube 56 extends snugly through an offset bore 58 through the piston head portion 20 and has its rearward and terminating at and in sealed communication with the passage 54. The forward end of the tube 56 terminates at the forward end of the main housing portion 14 and has a port 58 which provides fluid communication at that end of the piston 18. The fluid passage 54 is connected to a flexible line or hose 60 such that a fluid path is provided from the rod end of main housing portion 14 to the hose 60 via port 58, tube 56 and passage 54. The piston 18 can be reciprocated by alternately connecting the hoses 55 and 60 between the high pressure outlet side and tank of a source of fluid pressure. Prior to the crimping step, however, the nut 48 is torqued onto the bolt 50 by the torquing assembly.

As noted generally the torquing assembly includes the impacting assembly 24, which is supported within the hollow rod portion 23, and the fluid motor assembly 22, which drives the impacting assembly 24 and is supported within the hollow head portion 20. Thus the impacting assembly 24 and fluid motor assembly 22 are supported for relative reciprocating movement with the hollow piston 18. Appropriate seals between the motor assembly 22 and the head portion 20 block fluid flow through the hollow piston 18 between opposite sides of the head portion 20.

The impacting assembly 24 is shown in FIGS. 1 and 3 and is generally constructed in a manner known in the art. The assembly 24 includes a generally hat shaped driven member 70 which is rotatably supported within collar 28 via a radial bearing assembly 72. Axial loads applied to driven member 70 are taken by a thrust bearing 74 located between a flange 76 in driven member 70 and collar 28. A drive member 78 has a forward portion rotatably supported and piloted within a bore 80 in driven member 70. A radial bearing assembly 82 rotatably supports the rearward end of drive member 78. The driven member 70 has a socket 84 which receives a square ended drive shaft 86 which is driven by and is a part of the fluid motor assembly 22. A hollow impact collar 88 is piloted upon the drive member 78 and is urged forwardly under a preselected preload via a spring assembly 90. The impact collar 88 and spring assembly 90 can rotate together relative to the drive member 78 with axial loads being taken in direction by a thrust bearing 92.

The flange 76 on driven member 70 has a pair of diametrically oppositely extending relatively narrow teeth 94 which are engageable with diametrically oppositely located projections 96 on impact collar 88. The drive member 78 has a pair of diametrically oppositely located drive ball members 98 located in separate, partially circumferentially and helically extending guide grooves 100. The impact collar 88 has a pair of diametrically oppositely located axially extending semicircular slots 102 which receive the ball members 98. Now, with the teeth 94 engaging projections 96, as the drive member 78 is rotated the ball members 98 will, by virtue of engagement with slots 102, remain circumferentially fixed. The ball members 98, however, will move axially as the grooves 100 are rotated; this will cause the impact collar 88 to move axially rearwardly further compressing the spring in the spring assembly 90. When the impact collar 88 has moved axially rearwardly a sufficient distance the projections 96 will be moved to clear the teeth 94. The load on the spring in assembly 90 will then urge the impact collar 88 forward and the action of the ball members 98 and helical groove 100 will result in the impact collar 88 rotating rapidly as it moves axially; the impact collar 88 rotates until its projections 96 impact or engage the teeth 94. This impact provides the torque to the driven member 70 which torques the nut 48 onto the bolt 50. The driven member 70 has a socket member 103 secured to its outer end 104. The socket member 103 is adapted to matingly receive the nut 48.

As noted the impact assembly 24 is driven by a fluid motor assembly 22. Generally the motor assembly 22 is of a form well known in the art and known as a gerotor motor. The details of the motor assembly 22 are shown in FIGS. 1 and 4 – 7.

The geroter assembly 22 is driven by hydraulic fluid underpressure and includes an inner rotor 106 and an outer rotor 108. The inner and outer rotors (106, 108) have teeth and mating grooves, respectively, with the number of teeth being one less than the number of grooves. The output or drive shaft 86 is keyed to the inner rotor 106. The inner rotor 106 is supported for rotation within a housing assembly 109 via bearings 110 and 112 located on housing assembly 109 at opposite sides of drives shaft 86. The outer rotor 108 is supported for rotation in housing assembly 109 via a bearing 114. The housing assembly 109 includes complementary housing sections 116 and 118. The section 116 has a pair of arcuate cavities 120 and 122 and section 118 has a similar pair of arcuate cavities 124 and 126. The cavities 120 and 124 are opposite and in line with each other while the cavities 122 and 126 are opposite and in line with each other. Cavities 120 and 124 define inlet cavities to receive hydraulic fluid underpressure from the source. Cavities 122 and 126 define outlet cavities to receive and discharge hydraulic fluid out.

Hydraulic fluid underpressure is fed from a source of fluid pressure via an inlet hose or line 130 through a conduit 132 in the cap assembly 25 and through a fixed, hollow tube 134. The tube 134 sealing and slidingly fits within a bore 136 in head portion 20. A cross port 138 in head portion 20 communicates the bore 136 (and hence the tube 134) with the inside of head portion 20 at a position in line with an annular feed groove 140 located in the outer surface of housing section 116. Appropriate seals 142 and 144 seal opposite sides of the groove 140. The groove 140 is fluid communicated to the inlet cavities 120, 124 via ports 143; the cavities 120, 124 are also fluid communicated to the annular, closed chamber 141 housing bearing 114 via ports 145, 146. Thus the bearing 114 is lubricated and is pressurized by the inlet fluid to improve its operation. In response to the fluid under the pressure in inlet cavities 120, 124 the inner rotor 106 and outer rotor 108 will be rotated and the fluid trapped or carried between co-operating teeth and mating grooves will be discharged into the outlet cavities 122, 126. A plurality of ports 148 and conduits 150 connect the outlet cavities 122, 126 to an annular groove 152 located in the outer annular surface of the housing section 118. Opposite sides of the outlet groove 152 are sealed relative to the inside of head portion 120 via seals 142 and 154.

A port 156 in the wall of head portion 20 communicates the outlet groove 152 with a check valve 158 which permits only outlet flow from the gerotor motor 22. A bore 160 communicates the outlet from the check valve 158 to the rod end of the main housing portion 14. As will be seen when the gerotor motor 22 is actuated the return hose 55 is connected to tank and hence the outlet fluid from the motor 22 into the rod end of the main housing portion 14 is connected to tank. When, in the crimp portion of the cycle, the gerotor motor is deactuated and the hose 55 is pressurized to return the piston 18 to its original position, i.e. jaws 32 open, the check valve 158 prevents reverse fluid flow. The gerotor type motor has been found particularly advantageous because of its high speed and torque characteristics which permits the impact assembly 24 to be driven by a hydraulically actuated fluid motor. It is common to drive impact wrenches with pneumatic devices. The result of the combination shown and described is a compact tool capable of automatically torquing and crimping a fastener of the type noted. In order to provide automatic operation a controlled power supply 170, shown schematically in FIGS. 8 and 9, is used.

In general, the controlled power supply 170 is actuated by a trigger on the tool 10. Initially the tool 10 has its jaws 32 open, i.e. piston 18 in its forward most position, and the operator locates the socket member 103 over the nut 48. Next the operator initiates tool actuation by actuating a trigger; this places the power supply 170 in a condition which actuates the fluid motor assembly 22 to drive the impact assembly 24 whereby the nut 48 will be torque onto the bolt 50. The torque to which the nut 48 is set will be generally determined by the characteristics of the impact assembly 24. The power supply 170 is in the initial torque condition for a preselected, set time which is selected to be sufficient to permit the impact assembly 24 to torque the nut 48 to a desired torque preload. After the set time has elapsed, the power supply 170 will automatically switch into a crimp condition. In this condition the fluid motor assembly 22 is deactuated and the piston 18 is actuated to move rearwardly resulting in the jaws 32 being moved radially inwardly to crimp the nut 48. Upon the attainment of a preselected high magnitude of fluid pressure, sufficient to complete crimping, the power supply 170 is switched to a release condition in which the piston 18 is moved forwardly and the tool is placed in its original condition. Normally release of the trigger by the operator will interrupt the cycle and result in the tool 10 being returned to its original condition. An exception is during the crimp portion of the cycle. Once a preselected magnitude of pressure has been obtained the crimp portion of the cycle cannot be interrupted by the operator but will automatically be continued to completion; the tool 10 will be returned to its normal condition after completion of the crimp and upon release of the trigger by the operator. This feature prevents the operator from interrupting crimping and providing an incomplete crimp by inadvertently releasing the trigger. The above operation can be seen from the following description.

Looking now to FIG. 8, the controlled power supply 170 includes an electric motor 172 which is connected to drive a hydraulic pump 174, which pump 174 has an outlet line 176 and a return line 178 connected to a tank or reservoir 179 via a filter, etc. The tank 179 is connected to a return line 181 via an oil cooler 183. The fluid outlet line 176 is connected to a solenoid actuated valve 180 which is actuated by a solenoid 182. In its normal or deactuated position the valve 180 connects the high pressure output line 176 to an intermediate fluid line 184 and connects the tank return line 181 to the hose or line 130 from tool 10. The intermediate fluid line 184 is connected to a solenoid actuated valve 186 which is actuated by a solenoid 188. In its normal, deactuated condition the valve 186 connects intermediate line 184 to the hose or line 60 from tool 10. Thus in the deactuated condition fluid is applied to the head end of piston 18 and the rod end is connected to tank to thereby hold the piston 18 in its forwardmost position in which the jaw members 32 are fully opened. A pressure unloading valve 186 is connected between lines 55 and return line 181 via lines 190 and 192 such as to maintain the normal or idle pressure at a selected low level to protect the tool 10. When the operator actuates a trigger on the tool 10 solenoid 182 is actuated to shift valve 180 to its alternate position. In this position line 184 is opened and input pressure line 176 is connected to hose or line 130 to provide pressurized fluid to the motor 22 to drive impact assembly 24. Exhaust fluid from motor 22 is returned to tank 179 via the rod end of piston 18, line 60, valve 186 and line 181. Note that a check valve 194 connects line 130 with line 184 such that, when line 130 is pressurized and line 130 is not, fluid pressure flows to line 184, through valve 186 and to the head end of piston 20; this positively maintains the piston 20 in its return position during torquing of the nut 48. A timer is actuated in response to actuation of the trigger and after a preselected time sufficient for torquing the nut 48; this timer deactuates solenoid 182 and actuates solenoid 188. This returns valve 180 to its original position and actuates valve 186 to its alternate position. With valve 180 in its original position the inlet line 130 to motor 22 is connected to tank via line 181 and motor 22 is de-energized. At the same time line 184 is pressurized and is connected to line 60 to tool 10. At the same time line 55 is connected to return line 181 via line 198 via valve 186. In this condition the rod end of piston 20 is pressurized and the head end connected to tank resulting in the piston 20 being moved to initiate the crimping operation. At any time up to this point release of the trigger by the operator would automatically return the tool 10 back to its original condition. However, once the crimping has reached a selected minimum then the control is taken away from the operator. This is to prevent partial crimping by premature release of the trigger. At or before the crimping minimum noted, a visual inspection would show an incomplete crimp and hence there would be no chance of being misled. To accomplish the above, a pressure switch 200 is connected to the inlet line 184 and senses the magnitude of fluid pressure. When it reaches a selected minimum (indicating that the minimum crimp has been attained) a switch is closed paralleling the trigger to maintain the tool actuated even if the trigger is released. This condition persists until a second, high magnitude of pressure is sensed in response to which the pressure switch 200 will open another switch in series with the first switch whereby the parallel connection across the trigger will be broken. The high magnitude of pressure is selected such that at that level full crimping is known to occur. Now the trigger can be released and the tool 10 will be reset; also the pressure switch 200 will reset. Upon the latter occurrence, the solenoid 188 will be deactuated and valve 186 will be returned to its original condition. As noted, in the latter condition pressurized fluid is connected to the head end of piston 20 and the rod end is connected to tank 179. The unloading valve 186 is connected to line 130 via conduit or line 202 such that when valve 180 is in its alternate, actuated position with line 130 pressurized unloading valve 186 will be deactuated; this permits full pressure to be applied to the head end of piston 20 during torquing to prevent inadvertent crimping. When valve 180 is deactuated the unloading valve 186 is reset upon attainment of a preselected reset pressure in line 55 and thereafter will perform the normal pressure relief function. The reset pressure is above the normal pressure present in line 55 while the piston 20 is moving towards its initial position; this assures that the piston 20 will be returned rapidly at pressures higher than the normal relief or idle pressure provided by valve 186. A high pressure relief valve 204 is connected between line 184 and return line 181 via lines 206 and 208. The valve 204 is set to provide relief in the event excessive pressures are attained.

The electrical diagram for the above is shown in FIG. 9; thus an a-c source is connected to a step down transformer T1 which, via lines 210 and 212, has its secondary connected in parallel with the series circuit including trigger switch TR, a dropping resistor R1 and a transformer T2. The secondary of transformer T2 is connected to a solid state rectifier circuit 213 via taps 214, 216, 218 and 220. Circuit 213 provides a rectified 12 volt d-c output across conductors 222 and 224. Solenoid coil 182A (for solenoid 182) is connected in series with normally closed timer contacts Ta while solenoid coil 188A (for solenoid 188) is connected in series with normally open timer contacts Tb. Both of the latter series circuits are connected in parallel across output conductors 222 and 224. Diodes D1 and D2 provide transient protection for coils 182A and 188A, respectively. A timer To is connected across resistor R1 and the primary of transformer T2. When the trigger TR is actuated timer To is energized and initially contacts Ta are closed and Tb are opened whereby solenoid 182 is actuated and solenoid 188 is deactuated whereby the torquing cycle is initiated. When timer To times out it opens contact Ta and closes contact Tb initiating the crimping cycle.

The pressure switch 200 is shown to actuate two switches 200a and 200b with 200a being normally opened and 200b being normally closed. Switch 200a is connected in series with a relay CR and dropping resistor R2 with that series combination being connected in parallel with timer To (and hence in series with trigger switch TR. The other switch 200b is connected in series with normally open relay contacts CRa (for relay CR) with the series combination being connected in parallel with trigger switch TR. Thus during the crimping cycle when the preselected minimum pressure has been attained switch 200a is closed energizing relay Cr closing contacts CRa; this completes a parallel circuit around trigger TR so that its release would not interrupt the cycle. When the desired high magnitude of pressure is attained (indicative of final crimp) then pressure switch 200 will open contacts 200b opening up the parallel circuit around trigger TR; now when the operator released the trigger TR, the crimping cycle will end and the valves 180 and 186 will be returned to their initial conditions to return the tool 10 to its initial condition.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A system for applying a nut to a bolt, comprising: tool means for securing the nut to the bolt and comprising torque means for torquing the nut onto the bolt and crimp means for crimping the nut, and control means actuable for controlling actuation of said tool means for sequencing the operation of said torque means and said crimp means, said control means being actuable in response to actuation by an operator, said crimp means being operable by fluid pressure, said control means including pressure responsive means actuable in response to a preselected first magnitude of fluid pressure to maintain said crimp means actuated even though said control means is no longer actuated by the operator.

2. The system of claim 1 with said pressure responsive means being actuable to a preselected second magnitude of fluid pressure to permit deactuation of said crimp means, said second magnitude of fluid pressure being selected as indicative of the pressure at which a completed crimp to the nut has occurred.

3. The system of claim 2 with said control means including timing means actuable in response to actuation of said torque means for deactuating said torque means after a preselected, predetermined time interval.

4. The system of claim 3 with said timing means actuating said crimp means after said preselected time interval.

5. A system for applying a nut to a bolt, comprising: tool means for securing the nut to the bolt and comprising torque means for torquing the nut onto the bolt and crimp means for crimping the nut, and control means actuable for controlling actuation of said tool means for sequencing the operation of said torque means and said crimp means, including a source of hydraulic fluid pressure, with said torque means including a hydraulically actuated motor and with said crimp means including a hydraulically actuated piston supported in a chamber for reciprocation, said motor having a fluid inlet for receiving fluid under pressure from said source and having a fluid outlet through one side of said chamber for returning fluid to the source, said control means including conduit means for connecting the opposite side of said chamber to the fluid under pressure from the source during actuation of said fluid motor whereby reciprocation of said piston will be precluded during such actuation.

6. The system of claim 4 including a source of hydraulic fluid pressure, with said torque means including a hydraulically actuated motor and with said crimp means including a hydraulically actuated piston supported on a chamber for reciprocation, said motor having a fluid inlet for receiving fluid under pressure from said source and having a fluid outlet through one side of said chamber for returning fluid to the source, said control means including conduit means for connecting the opposite side of said chamber to the fluid under pressure from the source during actuation of said fluid motor whereby reciprocation of said piston will be precluded during such actuation.

7. The system of claim 4 with said control means including an electrical trigger switch actuable by the operator to actuate said control means and deactuable to deactuate said control means, said timing means actuated in response to actuation of said trigger switch, said pressure responsive means including a pressure responsive switch including normally open contacts and normally closed contacts defining a series circuit in parallel with said trigger switch, said pressure responsive means closing said normally open contacts in response to attainment of said first magnitude of fluid pressure and said normally closed contacts being opened in response to attainment of said second magnitude of fluid pressure.

8. The system of claim 6 with said control means including an electrical trigger switch actuable by the operator to actuate said control means and deactuable to deactuate said control means, said timing means actuated in response to actuation of said trigger switch, said pressure responsive means including a pressure responsive switch including normally open contacts and normally closed contacts defining a series circuit in parallel with said trigger switch, said pressure responsive means closing said normally open contacts in response to attainment of said first magnitude of fluid pressure and said normally closed contacts being opened in response to attainment of said second magnitude of fluid pressure.

9. The system of claim 1 with said control means including an electrical trigger switch actuable by the operator to actuate said control means and deactuable to deactuate said control means, said pressure responsive means including a pressure responsive switch including switching means in parallel with said trigger switch, said switching means responsive to attainment of said first magnitude of fluid pressure to provide a closed parallel circuit across said trigger switch and to provide an open parallel circuit across said trigger switch in response to attainment of said second magnitude of fluid pressure.

10. The system of claim 9 with said control means actuating said torque means in response to actuation of said trigger switch, said control means including timing means actuable in response to actuation of said trigger switch to deactuate said torque means after a preselected, predetermined time interval and to actuate said crimp means.

11. The system of claim 1 including, means for actuating the torque means, and means for actuating the crimp means.

12. The system of claim 5 including, means for actuating the torque means, and means for actuating the crimp means.

* * * * *